United States Patent
Chapman et al.

(10) Patent No.: US 10,781,573 B2
(45) Date of Patent: Sep. 22, 2020

(54) CONSTRUCTION MACHINE SENSOR SYSTEM

(71) Applicant: Topcon Positioning Systems, Inc., Livermore, CA (US)

(72) Inventors: Angus Chapman, Brisbane (AU); Reilly Edwards, Brisbane (AU); Peter Lambert, Allenview (AU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

(21) Appl. No.: 16/235,622

(22) Filed: Dec. 28, 2018

(65) Prior Publication Data

US 2020/0208380 A1    Jul. 2, 2020

(51) Int. Cl.
| | | |
|---|---|---|
| *E02F 9/26* | (2006.01) | |
| *F16M 13/02* | (2006.01) | |
| *H04Q 9/00* | (2006.01) | |
| *H01R 33/945* | (2006.01) | |
| *H01R 13/625* | (2006.01) | |
| *G01D 11/30* | (2006.01) | |
| *G01S 19/36* | (2010.01) | |
| *H01R 33/94* | (2006.01) | |
| *H01R 33/76* | (2006.01) | |
| *H01R 33/975* | (2006.01) | |

(52) U.S. Cl.
CPC .............. *E02F 9/26* (2013.01); *F16M 13/02* (2013.01); *G01D 11/30* (2013.01); *G01S 19/36* (2013.01); *H01R 13/625* (2013.01); *H01R 33/94* (2013.01); *H01R 33/9456* (2013.01); *H04Q 9/00* (2013.01); *H01R 33/7607* (2013.01); *H01R 33/9756* (2013.01)

(58) Field of Classification Search
CPC ........... E02F 9/26; F16M 13/02; G01D 11/30; G01S 19/36
See application file for complete search history.

(56) References Cited

U.S. PATENT DOCUMENTS

| | | |
|---|---|---|
| 4,315,594 A | 2/1982 | Niederöst |
| D316,713 S | 5/1991 | Sun |
| (Continued) | | |

FOREIGN PATENT DOCUMENTS

| | | |
|---|---|---|
| EP | 0014251 A1 | 8/1980 |
| EP | 2840559 A1 | 2/2015 |
| EP | 3270117 A1 | 1/2018 |

OTHER PUBLICATIONS

Notice of Allowance (PTOL-85) dated Feb. 5, 2020, in connection with U.S. Appl. No. 29/675,183, filed Dec. 28, 2018, 9 pgs.

(Continued)

*Primary Examiner* — Omeed Alizada
(74) *Attorney, Agent, or Firm* — Chiesa Shahinian & Giantomasi PC

(57) ABSTRACT

A system for mounting a sensor on a construction machine is described. The system includes a sensor having a bottom interface and a base for mounting the sensor on a construction machine. The base includes a top interface for rotatably interlocking with the bottom interface of the sensor. The rotatably interlocking of the base with the bottom interface of the sensor causes one or more terminals of the bottom interface of the sensor to communicatively couple to corresponding terminals of the top interface of the base.

15 Claims, 6 Drawing Sheets

(56) References Cited

U.S. PATENT DOCUMENTS

| | | |
|---|---|---|
| D363,930 S | 11/1995 | Bailey et al. |
| 6,598,835 B2 | 7/2003 | Minnick |
| 7,114,388 B1 | 10/2006 | French et al. |
| D568,183 S | 5/2008 | Daisuke |
| D594,399 S | 6/2009 | Johnson |
| D598,480 S | 8/2009 | Kanemitsu |
| D623,500 S | 9/2010 | Langner et al. |
| D661,980 S | 6/2012 | Rocquet |
| D673,029 S | 12/2012 | Apesteguia et al. |
| D695,591 S | 12/2013 | Ackerman et al. |
| D697,438 S | 1/2014 | Rector, III |
| D716,640 S | 11/2014 | Martinson |
| D732,926 S | 6/2015 | Booth et al. |
| D744,316 S | 12/2015 | Nook et al. |
| D745,369 S | 12/2015 | Tungesvick |
| D755,705 S | 5/2016 | Shin |
| D757,520 S | 5/2016 | Pratt |
| 9,354,158 B1 | 5/2016 | Van Dijk et al. |
| D766,069 S | 9/2016 | Miller |
| D767,218 S | 9/2016 | Hickling |
| D772,737 S | 11/2016 | Robinson et al. |
| D779,921 S | 2/2017 | Del Rossa |
| D779,922 S | 2/2017 | Del Rossa |
| D801,834 S | 11/2017 | Briheim et al. |
| D803,908 S | 11/2017 | Yamaguchi et al. |
| D822,081 S | 7/2018 | Yamaguchi et al. |
| D831,467 S | 10/2018 | Crichton et al. |
| D834,922 S | 12/2018 | Russo |
| D838,581 S | 1/2019 | Huang et al. |
| D859,968 S | 9/2019 | West |
| D860,765 S | 9/2019 | Tsay |
| D863,936 S | 10/2019 | Pratt et al. |
| D871,894 S | 1/2020 | Brett |
| 2003/0056868 A1 | 3/2003 | Gentry |
| 2003/0137658 A1* | 7/2003 | Ohtomo ............... G01C 15/004 356/141.4 |
| 2016/0180999 A1* | 6/2016 | Rattner ................. H01F 7/06 307/104 |
| 2018/0017414 A1 | 1/2018 | Binder et al. |

OTHER PUBLICATIONS

Notice of Allowance (PTOL-85) dated Feb. 6, 2020, in connection with U.S. Appl. No. 29/675,179, filed Dec. 28, 2018, 9 pgs.

International Search Report dated Mar. 16, 2020, in connection with International Patent Application No. PCT/US2019/062319, filed Nov. 20, 2019, 18 pgs.

Notice of Allowance dated Jun. 2, 2020, in connection with Design U.S. Appl. No. 29/675,176, filed Dec. 28, 2018, 20 pgs.

\* cited by examiner

CONSTRUCTION MACHINE SENSOR SYSTEM

BACKGROUND

The present invention relates generally to a sensor system, and more particularly to a sensor system for mounting on a construction machine to withstand the harsh conditions of a construction site.

A construction machine typically relies on a number of different sensors to perform tasks in a safe and efficient manner. However, during operation, the harsh vibrations and movements of the construction machine make implementation of those sensors difficult. Conventional sensors are implemented on a construction machine by separately mounting each sensor on the construction machine and running a cable from each sensor to a control unit. Such conventional sensors are tedious to configure and do not allow for the rapid addition or substitution of sensors of different types.

BRIEF SUMMARY OF THE INVENTION

In accordance with one or more embodiments, a system for mounting a sensor on a construction machine is described. The system includes a sensor having a bottom interface and a base for mounting the sensor on a construction machine. The base includes a top interface for rotatably interlocking with the bottom interface of the sensor. The rotatably interlocking of the base with the bottom interface of the sensor causes one or more terminals of the bottom interface of the sensor to communicatively couple to corresponding terminals of the top interface of the base.

In one embodiment, the bottom interface of the sensor includes a recessed center portion having a notch and the top interface of the base includes a protruding center portion having an extended portion. The extended portion of the protruding center portion of the top interface of the base is configured to fit into the notch of the recessed center portion of the bottom interface of the sensor when the top interface of the base is rotatably interlocked with the bottom interface of the sensor.

In one embodiment, the sensor includes a top interface for rotatably interlocking with a bottom interface of another sensor. The rotatably interlocking of the top interface of the sensor with the bottom interface of the other sensor causes one or more terminals of the top interface of the sensor to communicatively couple to corresponding terminals of the bottom interface of the other sensor. The top interface of the sensor may include a protruding center portion having an extended portion and the bottom interface of the other sensor may include a recessed center portion having a notch. The extended portion of the protruding center portion of the top interface of the sensor is configured to fit into the notch of the recessed center portion of the bottom interface of the other sensor when the top interface of the sensor is rotatably interlocked with the bottom interface of the other sensor.

In one embodiment, the one or more terminals of the bottom interface of the sensor includes one or more spring loaded terminals. The one or more spring loaded terminals communicatively couple to the corresponding terminals of the top interface when the top interface of the base is rotatably interlocked with the bottom interface of the sensor.

In one embodiment, the top interface of the base is for rotatably interlocking with the bottom interface of the sensor via a bayonet mount configuration.

In one embodiment, the sensor includes a global positioning system sensor.

In one embodiment, a sensor includes a bottom interface. The bottom interface includes coupling elements and a set of terminals. The coupling elements are for rotatably interlocking the sensor with a base mounted on a construction machine. The rotatably interlocking of the sensor with the base causes each terminal of the set of terminals of the bottom interface of the sensor to communicatively couple to corresponding terminals of the base.

In one embodiment, a method for rotatably interlocking a sensor with a base is described. A bottom interface of a sensor is positioned on a top interface of a base. The bottom interface of the sensor is rotated relative to the top interface of the base to rotatably interlock the sensor with the base. The rotating of the bottom interface of the sensor relative to the top interface of the base causing one or more terminals of the bottom interface of the sensor to communicatively couple to corresponding terminals of the top interface of the base.

These and other advantages of the invention will be apparent to those of ordinary skill in the art by reference to the following detailed description and the accompanying drawings.

DETAILED DESCRIPTION

Figure 1:
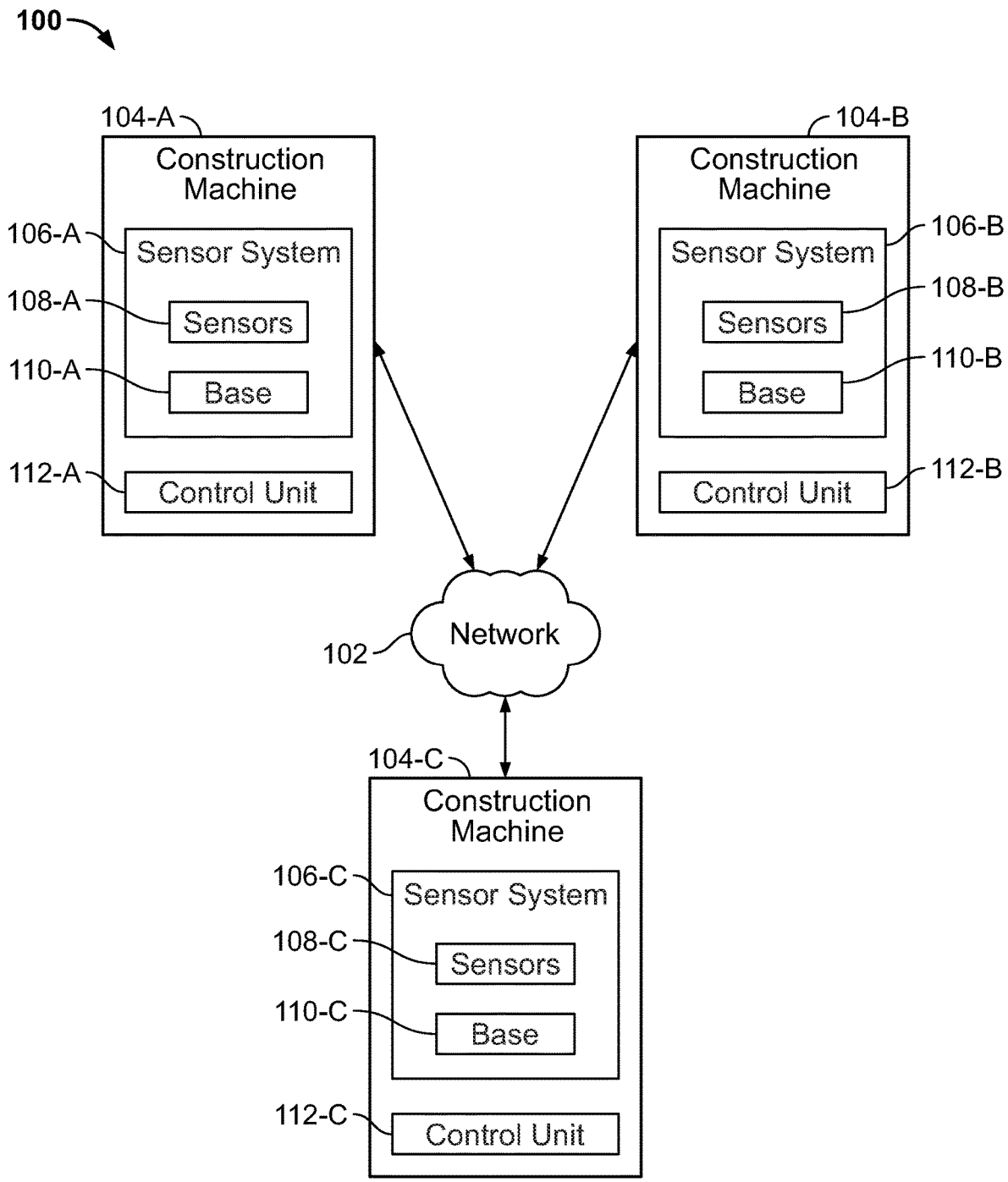
FIG. 1 shows a high-level overview of a construction site, in accordance with one or more embodiments.

FIG. 1 shows a high-level overview of a construction site 100, in accordance with one or more embodiments. Construction site 100 includes construction machines 104-A, 104-B, and 104-C (collectively referred to as construction machines 104). Construction machines 104 may include any machine or device used in construction, such as, e.g., an excavator, a bulldozer, a dump truck, a tractor, and/or any other type of construction equipment. Construction machines 104 work together to perform a construction task, such as, e.g., digging a trench, dispersing material over a target area, etc. Construction machines 104 may include any number of construction machines of a same or different type. While the embodiments discussed herein are described with respect to construction machines 104 operating in construction site 100, the invention is not so limited. Embodiments of the invention may be applied for any type of machine or vehicle operating in any environment. For example, embodiments of the invention may be applied for an agricultural machine, a mining machine, etc.

Each construction machine 104-A, 104-B, and 104-C includes a sensor system 106-A, 106-B, and 106-C (collectively referred to as sensor systems 106), respectively. Each sensor system 106-A, 106-B, and 106-C comprises one or more sensors 108-A, 108-B, and 108-C (collectively referred to as sensors 108) and a base 110-A, 110-B, and 110-C (collectively referred to as bases 110), respectively. Sensors 108 may include any number of sensors for generating data of, e.g., construction machine 104 or construction site 100 to facilitate the performance of the construction task. Exemplary sensors of the one or more sensors include a global positioning system (GPS) antenna/sensor, a reflective optical 360 degree prim unit for determining a position, a millimeter laser receiver for determining a height (in conjunction with a remote stationary laser), a gyroscope, an accelerometer, a temperature sensor, a moisture sensor, or any suitable sensor or combinations of sensors. Sensors 108 are mounted on construction machines 104 via bases 110.

Sensor system 106-A, 106-B, and 106-C are communicatively coupled to a control unit 108-A, 108-B, and 108-C (collectively referred to as control units 108), respectively. Control units 108 may include memory (e.g., random access memory) and storage (e.g., persistent storage) operatively coupled to one or more processors (not shown). The storage may store computer program instructions which may be loaded into the memory and executed by the processor to perform operations, e.g., for processing sensor data from sensor systems 106. In one embodiment, the computer program instructions may be for providing feedback or guidance to an operator of construction machine 104 to optimize performance of the construction task. Accordingly, control units 108 may include a display device (not shown) and/or a user interface (not shown).

Communications network 102 facilitates communications between construction machines 104 (or any other computing device) via control units 108 to perform the construction task. Communications network 102 may include any suitable network, such as, e.g., a wired or wireless computer network, the Internet, a telephone network, a cellular network, a satellite network, etc. In one embodiment, communications network 104 is a mesh network where each construction machine 104 acts as a node to cooperate in the distribution of data. In this embodiment, each node is communicatively coupled with all other nodes within communication range.

Construction machines 104 operating in construction environment 100 generate considerable amounts of vibration and experience other extreme conditions. Advantageously, sensors 108 are mounted on construction machines 104 via bases 110 in a manner to withstand the harsh vibrations and extreme conditions of construction environment 100, while allowing sensors 108 to be added, removed, and/or substituted in sensor system 106 with minimal reconfiguration of control units 108.

Figure 2A:
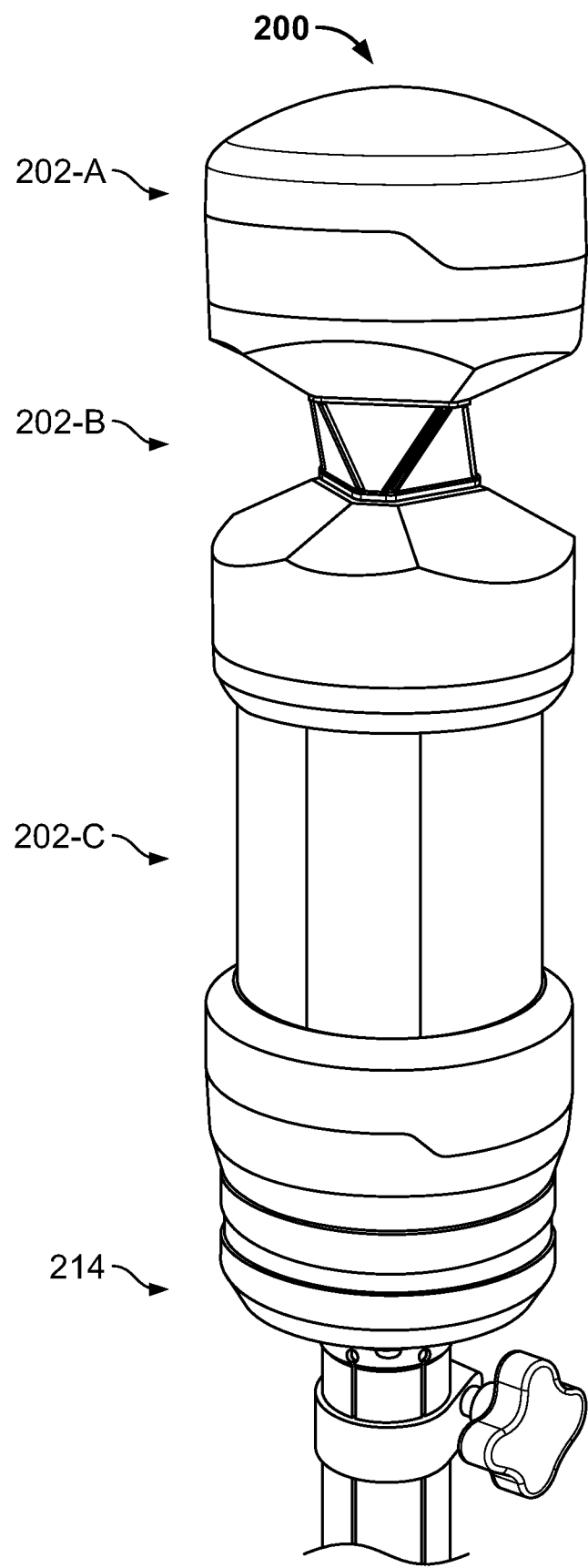
FIG. 2A shows a sensor system in an interlocked state, in accordance with one or more embodiments.

FIG. 2A shows an illustrative sensor system 200 in an interlocked state, in accordance with one or more embodiments. In one embodiment, sensor system 200 may be sensor system 106 in FIG. 1. Sensor system 200 includes a top sensor 202-A, an intermediate sensor 202-B, and a bottom sensor 202-C (collectively referred to as sensors 202) coupled to base 214 for mounting on a construction machine (e.g., construction machine 104 in FIG. 1). Sensors 202 and base 214 are configured to rotatably (or pivotably) interlock with each other to form a sensor system (e.g., sensor system 106 of FIG. 1). Accordingly, top sensor 202-A is configured to rotatably interlock with intermediate sensor 202-B, intermediate sensor 202-B is configured to rotatably interlock with bottom sensor 202-C, and bottom sensor 202-C is configured to rotatably interlock with base 214.

Figure 2B:
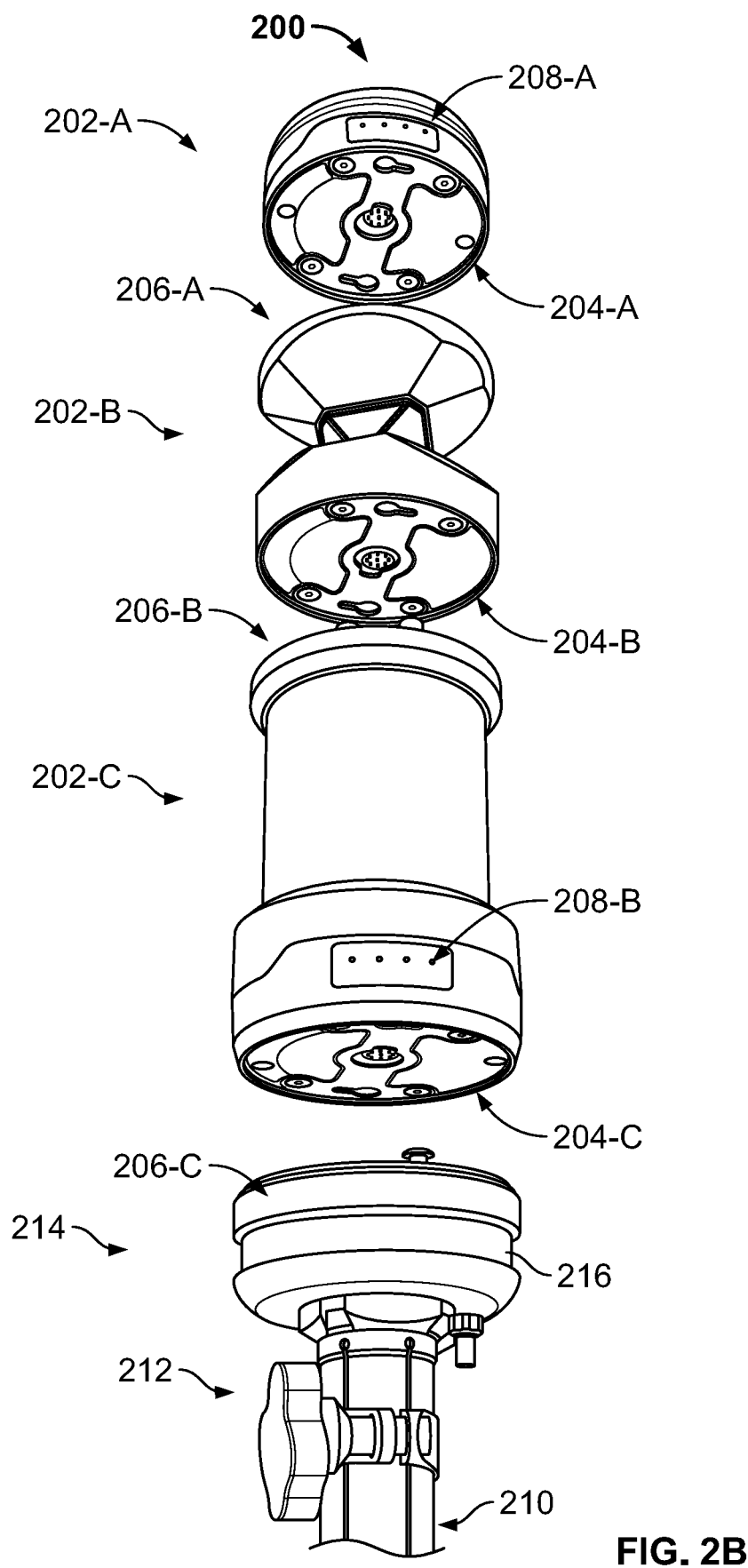
FIG. 2B shows an exploded bottom perspective view of a sensor system in a non-interlocked state, in accordance with one or more embodiments.
Figure 2C:
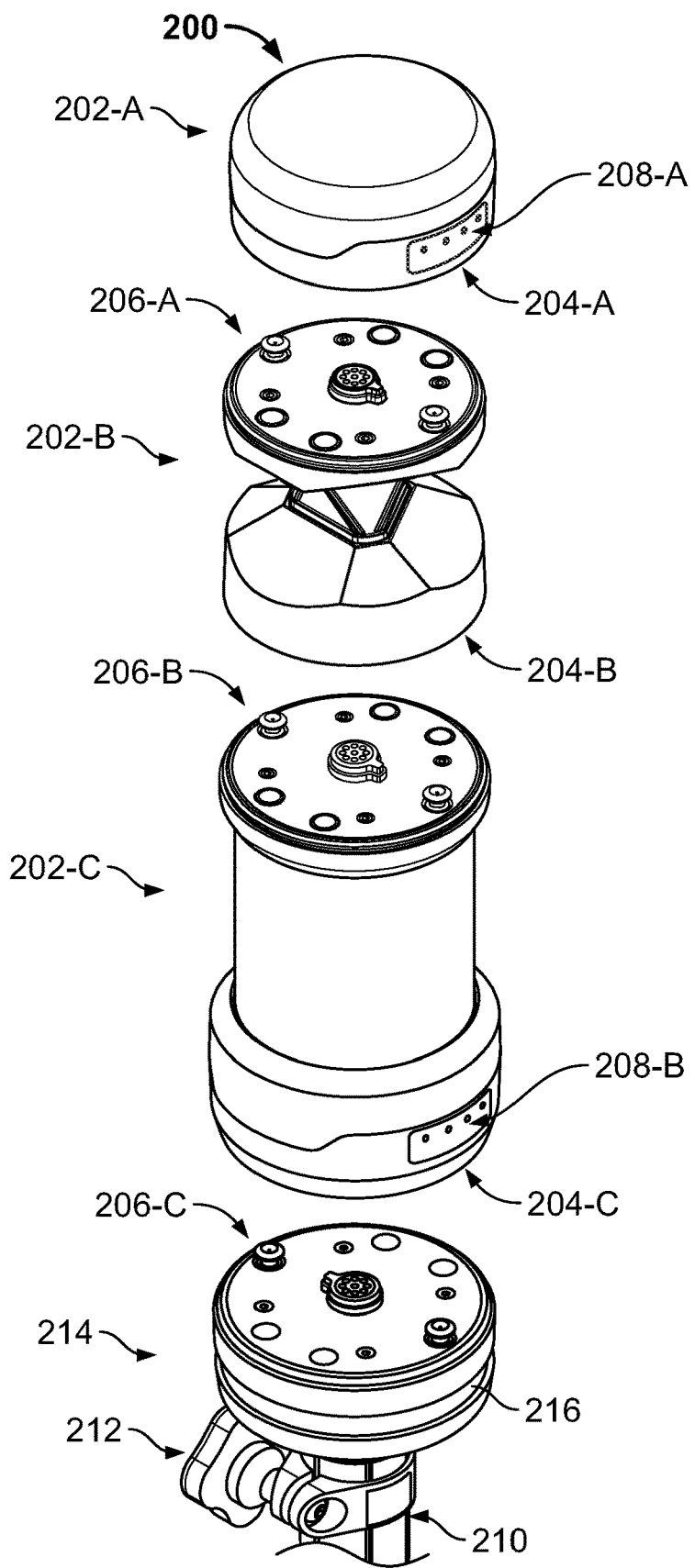
FIG. 2C shows an exploded top perspective view of a sensor system in a non-interlocked state, in accordance with one or more embodiments.

FIG. 2B shows an exploded bottom perspective view of sensor system 200 in a non-interlocked state and FIG. 2C shows an exploded top perspective view of sensor system 200 in a non-interlocked state, in accordance with one or more embodiments. Intermediate sensor 202-B, bottom sensor 202-C, and base 214 each include a top interface 206-A, 206-B, and 206-C (collectively referred to as top interface 206), respectively, as shown in FIG. 2C. Top sensor 202-A, intermediate sensor 202-B, and bottom sensor 202-C each include a bottom interface 204-A, 204-B, and 204-C (collectively referred to as bottom interface 204), respectively, as shown in FIG. 2B. Top interface 206 is configured to rotatably interlock with bottom interface 208 by any suitable means to thereby rotatably interlock, e.g., top sensor 202-A with intermediate sensor 202-B, intermediate sensor 202-B with bottom sensor 202-C, and bottom sensor 202-C with base 214. Base 214 is configured to mount sensors 202 on a construction machine (not shown). For example, securing element 212, such as, e.g., a pole clamp, may secure base 214 to pole 210, which is mounted on the construction machine. Base 214 may include a vibration isolator pad 216 for absorbing vibrations (e.g., from a construction machine) and reducing the impact of the vibrations on sensors 202.

In one embodiment, one or more sensors 202 may include one or more status indicators 208-A and 208-B, such as, e.g., light-emitting diodes (LEDs), display devices, etc. Indicators 208-A and 208-B indicate the status (e.g., power, network connectivity, etc.) of their sensors 202-A and 202-C respectively.

Figure 3A:
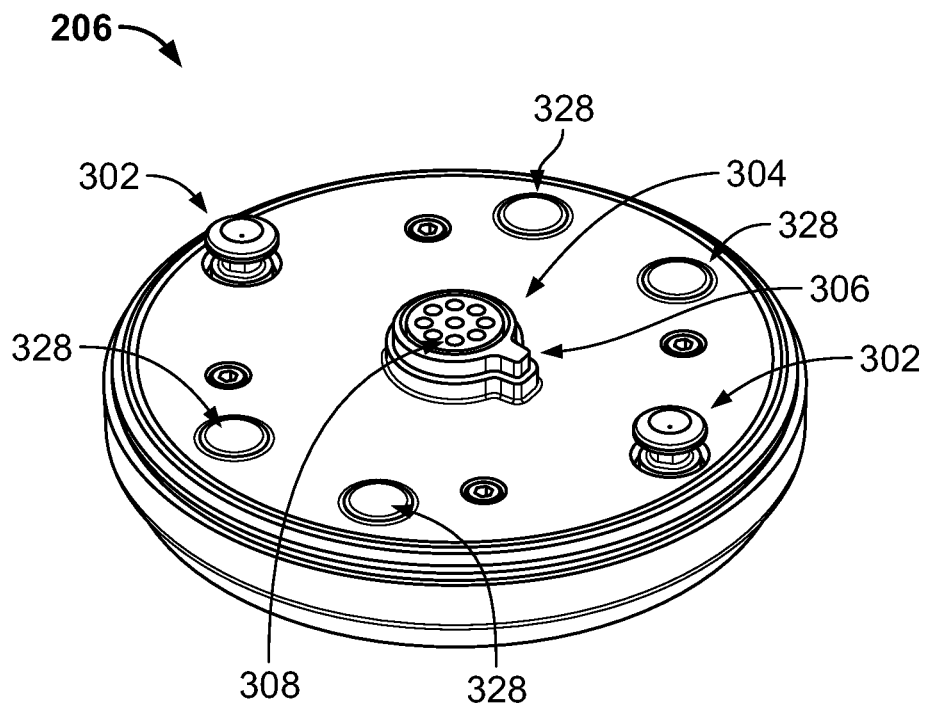
FIG. 3A shows a top interface of a sensor and/or base, in accordance with one or more embodiments.
Figure 3B:
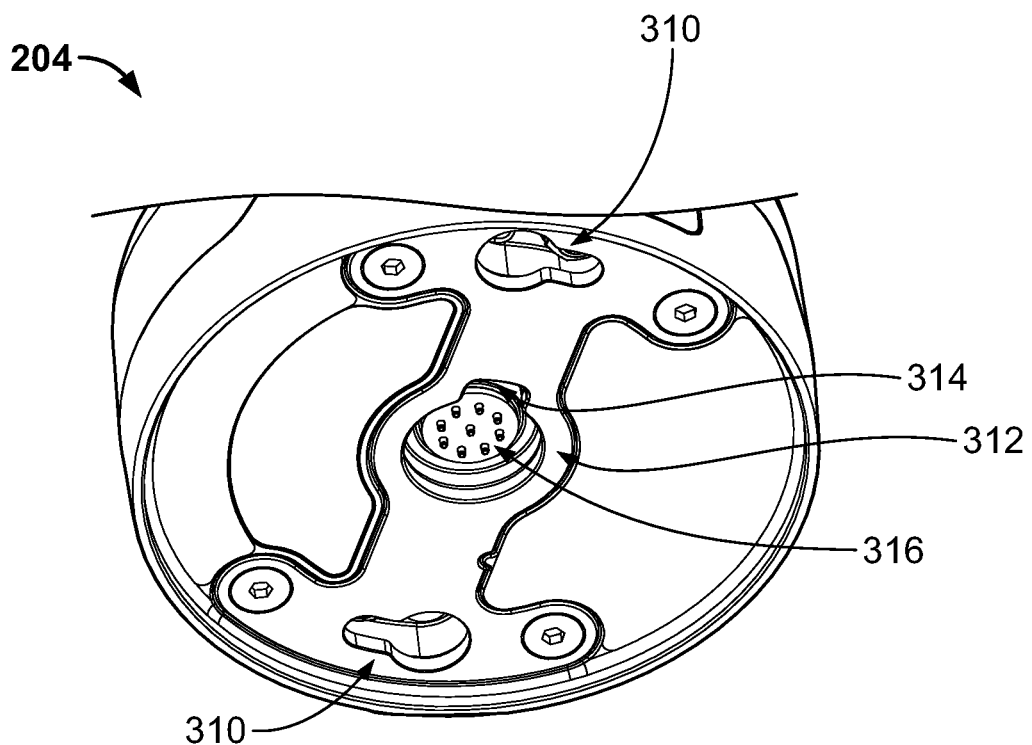
FIG. 3B shows a bottom interface of a sensor, in accordance with one or more embodiments.

FIG. 3A shows an exemplary top interface 206 and FIG. 3B shows an exemplary bottom interface 204, in accordance with one embodiment. While interfaces 206 and 204 are shown and described as being a top interface and a bottom interface respectively, it should be understood that top interface 206 may alternatively be a bottom interface (of sensors 202) and bottom interface 208 may alternatively be a top interface (sensors 202 and/or base 214).

Male coupling elements 302 of top interface 206 are configured to couple with corresponding female coupling elements 310 of bottom interface 204 to allow top interface 206 to rotatably interlock with bottom interface 204. In one embodiment, male coupling elements 302 are radial pins and female coupling elements 310 are slotted receptors to form a bayonet mount configuration, as shown and described in more detail with respect to FIGS. 3C and 3D. It should be understood that male coupling elements 302 and female coupling elements 310 may be any suitable coupling element for rotatably interlocking top interface 206 and bottom interface 204, and are not limited to the bayonet mount configuration shown and described herein.

Figure 3C:
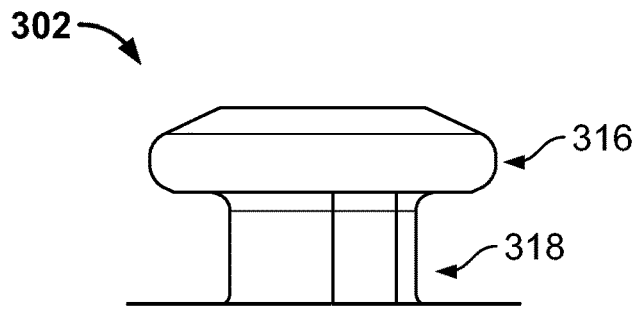
FIG. 3C shows a side view of a male coupling element, in accordance with one or more embodiments.

FIG. 3C shows a side view of male coupling elements 302 of FIG. 3A, in accordance with one embodiment. Male coupling element 302 is shown as a radial pin having a head 316 and a tail 318. Head 316 has a diameter larger than the diameter of tail 318.

Figure 3D:
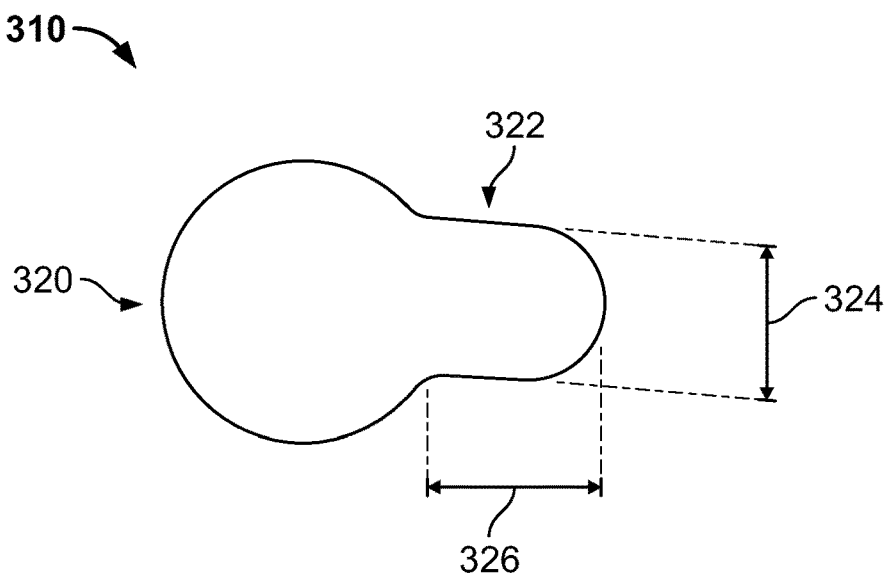
FIG. 3D shows a top down view of a female coupling element, in accordance with one or more embodiments.

FIG. 3D shows a top down view of female coupling elements 310 of FIG. 3B, in accordance with one embodiment. Female coupling element 310 is shown as a slotted receptor having receptor 320 and slot 322. Receptor 320 has a diameter larger than the diameter of head 316 of male coupling element 302 to allow head 316 to be inserted into receptor 320. Slot 322 has a width 324 larger than the diameter of tail 318 but smaller than the diameter of head 316 of male coupling element 302 to allow top interface 206 to rotatably interlock with bottom interface 204.

Referring back to FIGS. 3A and 3B, top interface 206 includes a protruding center portion 304 comprising an extended portion 306 and a set of receiving terminals 308. Bottom interface 204 includes a recessed center portion 312 comprising a notch 314 and a set of connecting terminals 316. Each sensor 202 and base 214 has a plurality of different connections. In one embodiment, the plurality of different connections comprises a connection for power, a connection for ground, a connection for controller area network (CAN) high, a connection for CAN low, a connection for communication between sensors 202, and four connections for other data (e.g., Ethernet connections). Accordingly, each connection has a respective receiving terminal 308 and its corresponding connecting terminal 316. The receiving terminals 308 of the top interface 206 of the base 214 communicatively couple to a control unit (e.g., control unit 112 of FIG. 1) to transmit and/or receive data from sensors 202. While the set of receiving terminals 308 and their corresponding connecting terminals 316 are shown in FIG. 3A as having nine connections (i.e., nine receiving terminals 308 and nine corresponding connecting terminals 316), it should be understood that the set of receiving terminals 308 and their corresponding set of connecting terminals 316 may comprise any number of terminals. The terminals in the set of connecting terminals 316 may be of any suitable length to allow connecting terminals 316 to communicatively couple to corresponding terminals of the set of receiving terminals 308 when top interface 206 rotatably interlocks with bottom interface 204. In one embodiment, connecting terminals 316 are spring loaded connecting terminals 316 and receiving terminals 308 are flush with a top surface of protruding center portion 304 to facilitate rotation of top interface 206 with bottom interface 204 and thereby communicatively couple connecting terminals 316 and receiving terminals 308 without damage.

With reference to FIGS. 3A-3D, in operation, to rotatably interlock top interface 206 with bottom interface 204, top interface 206 is positioned on (i.e., pressed against) bottom interface 204 such that head 316 of male couplers 302 is inserted into receptor 320 of female coupling elements 310 and protruding center portion 304 is inserted into recessed center portion 312. In particular, protruding center portion 304 is inserted into recessed center portion 312 such that extended portion 306 fits within notch 314 to thereby ensure top interface 206 is correctly oriented with bottom interface 204 and receiving terminals 308 communicatively couple with their corresponding connecting terminals 316. The insertion of protruding center portion 304 into recessed center portion 312 causes spring loaded connecting terminals 316 to retract to a surface of protruding center portion 304.

Top interface 206 is then rotated relative to bottom interface 204 such that tail 318 is rotated into slot 322. While top interface 206 is rotated in the clockwise direction into slot 322 in FIGS. 3A-3D, it should be understood that top interface 206 may be rotated in the counter-clockwise direction into slot 322 in a different configuration of female coupling elements 310. The larger diameter of head 316 relative to the smaller width 324 of slot 322 causes top interface 206 to rotatably interlock with bottom interface 204. The rotation of top interface 206 relative to bottom interface 204 causes spring loaded connecting terminals 316 to couple with corresponding ones of the receiving terminals 308. The degree and direction of rotation of top interface 206 relative to bottom interface 204 to rotatably interlock top interface 206 with bottom interface 204 is based on length 326 of slot 322. In one embodiment, the top interface 206 is rotated 7.2 degrees clockwise relative to bottom interface 204. Top interface 206 includes raised portions 328 to create a firm fit with bottom interface 204 when interlocked. In one embodiment, slot 322 of female coupling elements 310 include a vertical spring loaded bullet head plunger (not shown) to securely interlock male coupling elements 302 and female coupling elements 310 and thereby prevent unintentional unlocking, e.g., due to vibrations.

Advantageously, sensors 202 are mounted on construction machines via bases 214 in a manner to withstand the harsh vibrations and extreme conditions of a construction environment, while allowing sensors 108 to be added, removed, and/or substituted in sensor system 106 with minimal reconfiguration of control units 108. In particular, base 214 comprises vibration isolator pad 216 for reducing the effect of vibrations on sensors 202. Raised portions 328 of top interface 206 create interference flex pressure with bottom interface 204 to further reduce the effects of shock and vibration. Spring loaded connecting terminals 316 are able to extend and compress under vibration and shock to main connection.

In one embodiment, a single connection associated with a receiving terminal 308 and its corresponding connecting terminals 316 is for communicating, e.g., between sensors 202 (FIGS. 2A and 2B), control unit 112 (FIG. 1), etc. For example, a frequency and/or amplitude of a voltage on the particular terminal may be modulated for bi-directional communication between sensors 202, control unit 112, etc. In one embodiment, an upper sensor (e.g., sensor 202-A) may send a request for information to a lower sensor below it (e.g., sensor 202-B or 202-C) and the lower sensor will respond with its information (e.g., sensor type, location of the sensor relative to the other sensors, etc.).

Figure 4:
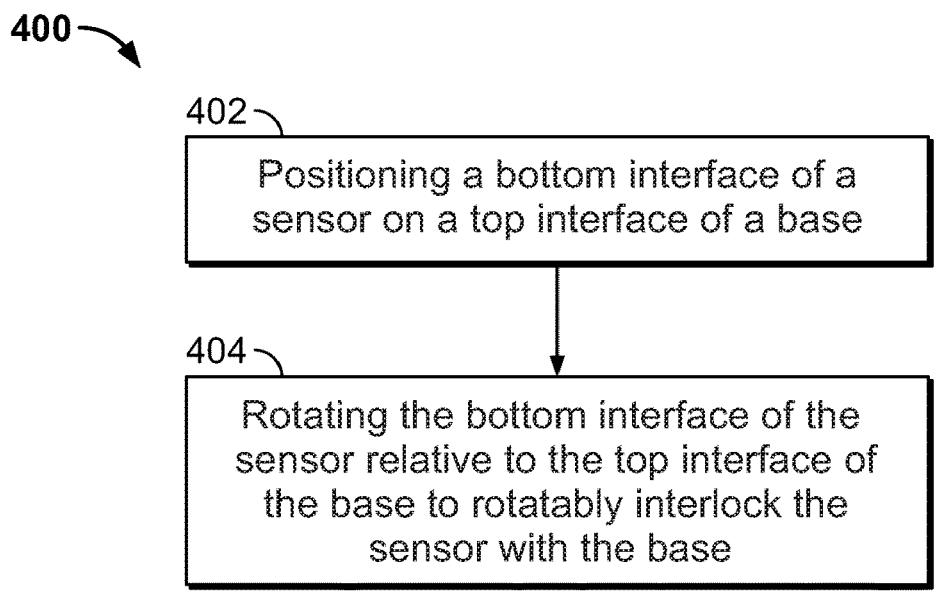
FIG. 4 shows a flow diagram of a method for rotatably interlocking a sensor with a base, in accordance with one or more embodiments.

FIG. 4 shows a flow diagram of a method 400 for rotatably interlocking a sensor with a base for mounting the sensor on a construction machine, in accordance with one or more embodiments. Method 400 will be described with reference to sensor system 200 of FIGS. 2A-2B and 3A-3D.

At step 402, a bottom interface 204-C of a sensor 202-C is positioned on a top interface 206-C of a base 214. For example, the sensor 202-C may be a GPS sensor, a gyroscope, an accelerometer, a temperature sensor, a moisture sensor, or any suitable sensor or combinations of sensors. In one embodiment, head 316 of male couplers 302 of top interface 206-C of base 214 is inserted into receptor 320 of female coupling elements 310 of bottom interface 204-C of sensor 202-C and protruding center portion 304 of top interface 206-C of base 214 is inserted into recessed center portion 312 of bottom interface 204-C of sensor 202-C. In one embodiment, protruding center portion 304 of top interface 206-C is inserted into recessed center portion 312 of bottom interface 204-C such that extended portion 306 of protruding center portion 304 fits within notch 314 of recessed center portion 312. The extended portion 306 and notch 314 ensure that sensor 202-C is correctly oriented with base 214, to thereby ensure that connecting terminals 316 of bottom interface 204-C of sensor 202-C communicatively couples with their corresponding receiving terminals 308 of top interface 206-C of base 214.

At step 404, the bottom interface 204-C of the sensor 202-C is rotated relative to the top interface 206-C of the base 214 to rotatably interlock the sensor 202-C with the base 214. In particular, tail 318 of coupling element 302 of top interface 206-C of the base 214 is rotated into slot 322 of coupling element 310 of bottom interface 204-C of the sensor 202-C. The larger diameter of head 316 relative to the smaller width 324 of slot 322 causes top interface 206 to rotatably interlock with bottom interface 204. The rotatably interlocking of the base 214 with the sensor 202-C causes one or more terminals 316 of the bottom interface 204-C of the sensor 202-C to communicatively couple to corresponding terminals 308 of the top interface 206-C of the base 314. The degree and direction of rotation of top interface 206-C relative to bottom interface 204-C to rotatably interlock sensor 202-C with base 214 is based on length 326 of slot 322 and the length of notch 314 of recessed portion 312 (receiving extended portion 306 of protruding center portion 304). In one embodiment, the top interface 206-C is rotated 7.2 degrees clockwise relative to bottom interface 204-C.

In one embodiment, sensor 202-C may include a top interface 206-B, which may be positioned on a bottom interface 204-B of another sensor 202-B. The top interface 206-B of sensor 202-C may be rotated relative to bottom interface 204-B of the other sensor 202-B to rotatably interlock sensors 202-B and 202-C. The rotation of the top interface 206-B of sensor 202-C relative to bottom interface 204-B of the other sensor 202-B causes one or more terminals of the top interface 206-B of sensor 202-C to communicatively couple to corresponding terminals of bottom interface 204-B of the other sensor 202-B.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A sensor system, comprising:
   a sensor comprising a bottom interface, the bottom interface comprising a recessed center portion having a notch; and
   a base for mounting the sensor on a construction machine, the base comprising a top interface for rotatably interlocking with the bottom interface of the sensor, the top interface comprising a protruding center portion having an extended portion,
   the rotatably interlocking of the base with the bottom interface of the sensor causing the extended portion of the protruding center portion of the top interface of the base to rotate within the notch of the recessed center portion of the bottom interface of the sensor, thereby causing one or more terminals of the bottom interface of the sensor to communicatively couple to corresponding terminals of the top interface of the base.

2. The sensor of claim 1, wherein the sensor further comprises a top interface, the top interface of the sensor for rotatably interlocking with a bottom interface of another sensor.

3. The sensor of claim 2, wherein the rotatably interlocking of the top interface of the sensor with the bottom interface of the other sensor causes one or more terminals of the top interface of the sensor to communicatively couple to corresponding terminals of the bottom interface of the other sensor.

4. The sensor of claim 2, wherein:
   the top interface of the sensor comprises a protruding center portion having an extended portion,
   the bottom interface of the other sensor comprises a recessed center portion having a notch, and
   the extended portion of the protruding center portion of the top interface of the sensor is configured to fit into the notch of the recessed center portion of the bottom interface of the other sensor when the top interface of the sensor is rotatably interlocked with the bottom interface of the other sensor.

5. The sensor of claim 1, wherein:
   the one or more terminals of the bottom interface of the sensor comprise one or more spring loaded terminals, and
   the one or more spring loaded terminals communicatively couple to the corresponding terminals of the top interface when the top interface of the base is rotatably interlocked with the bottom interface of the sensor.

6. The sensor of claim 1, wherein the top interface of the base is for rotatably interlocking with the bottom interface of the sensor via a bayonet mount configuration.

7. The sensor of claim 1, wherein the sensor comprises a global positioning system sensor.

8. The system of claim 1, further comprising the construction machine.

9. A sensor having an interface, the interface comprising:
   coupling elements for rotatably interlocking the sensor with a base;
   a set of terminals; and
   a protruding center portion having an extended portion,
   wherein the rotatably interlocking of the sensor with the base causes the extended portion of the protruding center portion of the interface of the sensor to rotate within a notch of a recessed center portion of the base, thereby causing each terminal of the set of terminals of the interface of the sensor to communicatively couple to corresponding terminals of the base.

10. The sensor of claim 9, wherein the interface is a bottom interface and the sensor further comprises a top interface, the top interface comprising:
    second coupling elements for rotatably interlocking the sensor with another sensor; and
    a second set of terminals, wherein the rotatably interlocking of the sensor with the other sensor causes each terminal of the second set of terminals of the top interface of the sensor to communicatively couple to corresponding terminals of the other sensor.

11. The sensor of claim 10, wherein the top interface further comprises a recessed center portion having a notch, wherein an extended portion of a protruding center portion of the other sensor is configured to fit into the notch of the recessed center portion of the top interface of the sensor when the sensor is rotatably interlocked with the other sensor.

12. The sensor of claim 9, wherein the set of terminals comprises a set of spring loaded terminals for communicatively coupling to corresponding terminals of the base.

13. The sensor of claim 9, wherein the sensor comprises a global positioning system sensor.

14. A method for communication between a sensor and a rotatably interlocked other sensor, the rotatably interlocking of the sensor with the other sensor causing an extended portion of a protruding center portion of the sensor to rotate within a notch of a recessed center portion of the other sensor, thereby causing each terminal of a set of terminals of the sensor to communicatively couple to corresponding terminals of the other sensor, the method comprising:
- transmitting a signal to the other sensor via a particular terminal of the set of terminals of the sensor and a corresponding terminal of the other sensor; and
- receiving another signal from the other sensor via the particular terminal of the sensor and the corresponding terminal of the other sensor.

15. The method of claim 14, wherein the sensor comprises a global positioning system sensor.

* * * * *

UNITED STATES PATENT AND TRADEMARK OFFICE
CERTIFICATE OF CORRECTION

| | | |
|---|---|---|
| PATENT NO. | : 10,781,573 B2 | Page 1 of 1 |
| APPLICATION NO. | : 16/235622 | |
| DATED | : September 22, 2020 | |
| INVENTOR(S) | : Chapman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 7 days.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*